United States Patent
Bosen et al.

(10) Patent No.: US 8,888,179 B1
(45) Date of Patent: Nov. 18, 2014

(54) TUBE-EXPANSION ENERGY ATTENUATING SYSTEM

(71) Applicant: Armorworks Enterprises, LLC, Chandler, AZ (US)

(72) Inventors: David A. Bosen, Tempe, AZ (US); Ryan Michael Larson, Phoenix, AZ (US); Terry Wilhelm, Gilbert, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 148 days.

(21) Appl. No.: 13/778,779

(22) Filed: Feb. 27, 2013

Related U.S. Application Data

(60) Provisional application No. 61/604,389, filed on Feb. 28, 2012.

(51) Int. Cl.
*B60N 2/427* (2006.01)
*F16F 7/12* (2006.01)
*B60N 2/42* (2006.01)

(52) U.S. Cl.
CPC .............. *F16F 7/125* (2013.01); *B60N 2/4242* (2013.01); *B60N 2/42709* (2013.01)
USPC .................................. 297/216.16; 297/216.17

(58) Field of Classification Search
CPC .. B60N 2/427; B60N 2/4242; B60N 2/42709; B60R 19/36; B64D 2011/0627; F16F 7/12
USPC ...................... 297/216.16–216.18; 244/122 R
See application file for complete search history.

(56) References Cited

U.S. PATENT DOCUMENTS

| | | | |
|---|---|---|---|
| 3,143,321 A | 8/1964 | McGehee et al. | |
| 4,523,730 A * | 6/1985 | Martin | 244/122 R |
| 4,997,233 A * | 3/1991 | Sharon | 297/216.17 |
| 5,351,791 A * | 10/1994 | Rosenzweig | 188/372 |
| 6,308,809 B1 | 10/2001 | Reid et al. | |
| 6,457,570 B2 | 10/2002 | Reid et al. | |
| 6,695,065 B2 | 2/2004 | Simpson et al. | |
| 8,408,643 B2 * | 4/2013 | Honnorat | 297/216.1 |
| 8,616,635 B2 * | 12/2013 | Dock | 297/216.16 |
| 8,702,147 B2 * | 4/2014 | Cantor et al. | 296/68.1 |
| 2010/0270836 A1 * | 10/2010 | Mowry et al. | 297/216.19 |

OTHER PUBLICATIONS

M Shakeri, Expansion of circular tubes by rigid tubes as impact energy absorbers: experimental and theoretical investigation, International Journal of Crashworthiness, 2007, vol. 12, pp. 493-501, Taylor and Francis Group.

* cited by examiner

*Primary Examiner* — Sarah B McPartlin
(74) *Attorney, Agent, or Firm* — James L. Farmer

(57) ABSTRACT

Designs and methods are provided for an energy attenuating device. In one exemplary embodiment the device comprises an elongated metal tube having an expanded portion at a first end thereof, and an unexpanded portion extending from the expanded portion to a second end, wherein the first end is attached to a fixed structure. A mandrel is disposed in the expanded portion of the elongated metal tube, having a diameter greater than the inside diameter of the unexpanded portion of the metal tube. A tension member is attached to the mandrel and extends out of the second end of the metal tube.

11 Claims, 8 Drawing Sheets

TUBE-EXPANSION ENERGY ATTENUATING SYSTEM

TECHNICAL FIELD AND BACKGROUND

Provisional Patent Application Ser. No. 61/604,389, to which the present application claims priority, is hereby incorporated by reference. The field of the present disclosure relates generally to energy attenuating ("EA") devices for absorbing or attenuating high energy shock loads. The field may further relate to use of EA devices in vehicles, and more particularly minimizing injury to vehicle crew members during an under vehicle mine blast or other potentially lethal, sudden impact event.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
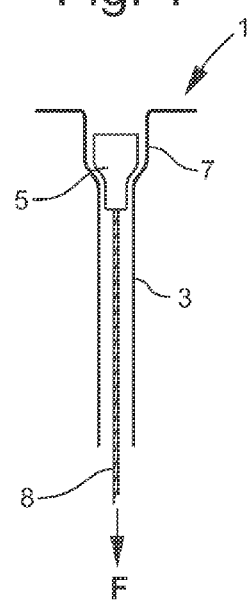
FIG. 1 is a cross section of an exemplary tube-expansion EA device in accordance with the present disclosure.

Referring now specifically to the drawings, a tube-expansion energy attenuation (EA) device according to one exemplary embodiment of the present disclosure is illustrated in FIG. 1, and indicated generally at reference numeral 1. EA device 1 comprises a metal tube 3, and an oversized mandrel 5 disposed in an expanded or flared end portion 7 of tube 3. The flared end portion 7 is held fixed, and a tension member, such as the depicted pull cable 8, is attached to mandrel 5, extending out the other end of tube 3. Tube 3 may be round, square, or any other cross sectional shape; and made of any relatively strong but deformable metal such as aluminum, magnesium, steel, and the like.

Figure 2A:
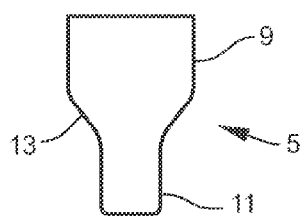
FIGS. 2a and 2b depict exemplary embodiments of the mandrel portion of the EA device of FIG. 1.
Figure 2B:
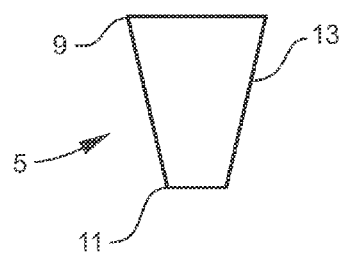

Referring to FIGS. 2a and 2b, the mandrel 5 has a relatively wide back end 9 that is wider than the un-flared portion of tube 3, but fits within the flared end 7, a relatively narrow front end 11 that fits within the un-flared portion of tube 3, and a tapered section 13 between the two ends. The ends 9, 11, may comprise cylindrical sections that take up substantial portions of the overall length of mandrel 5 as shown in FIG. 2A. Alternatively, the mandrel may comprise a frustro-conical shape, where the entire length of mandrel 5 comprises a tapered section 13 as shown in FIG. 2B, or anything in between the shapes of FIGS. 2A and 2B.

Figure 3:
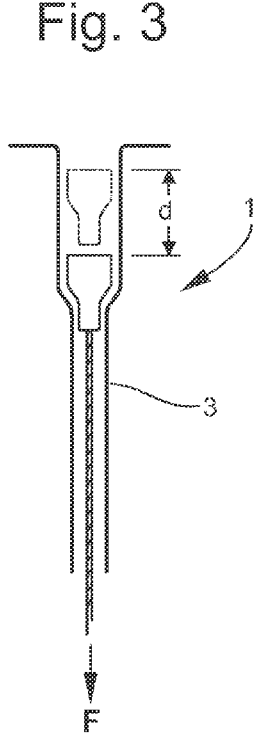
FIG. 3 is the EA device of FIG. 1, however with the mandrel portion displaced part way down the tube.

In operation, a pulling force is applied to the end of cable 8 in the direction indicated by arrow 'F' in FIG. 1. If the force F is great enough, the mandrel 5 will be forced through tube 3, expanding and plastically deforming the tube as the tapered section 13 and back end 9 of mandrel 5 move from the flared portion 7 into the unexpanded portion of the tube. FIG. 3 illustrates the EA device 1 as it would appear following the application of a load F sufficient to displace the mandrel through tube 3 by a distance 'd' from the initial position of FIG. 1 (shown here in dashed lines). Work is expended as the tube 3 is plastically deformed, but not ruptured or breached by the mandrel. Thus, if the force F is the result of an instantaneous energy pulse, such as may result from an explosive event, some or all of the energy pulse may be absorbed in the form of work expended to displace the mandrel and expand tube 3.

Figure 4:
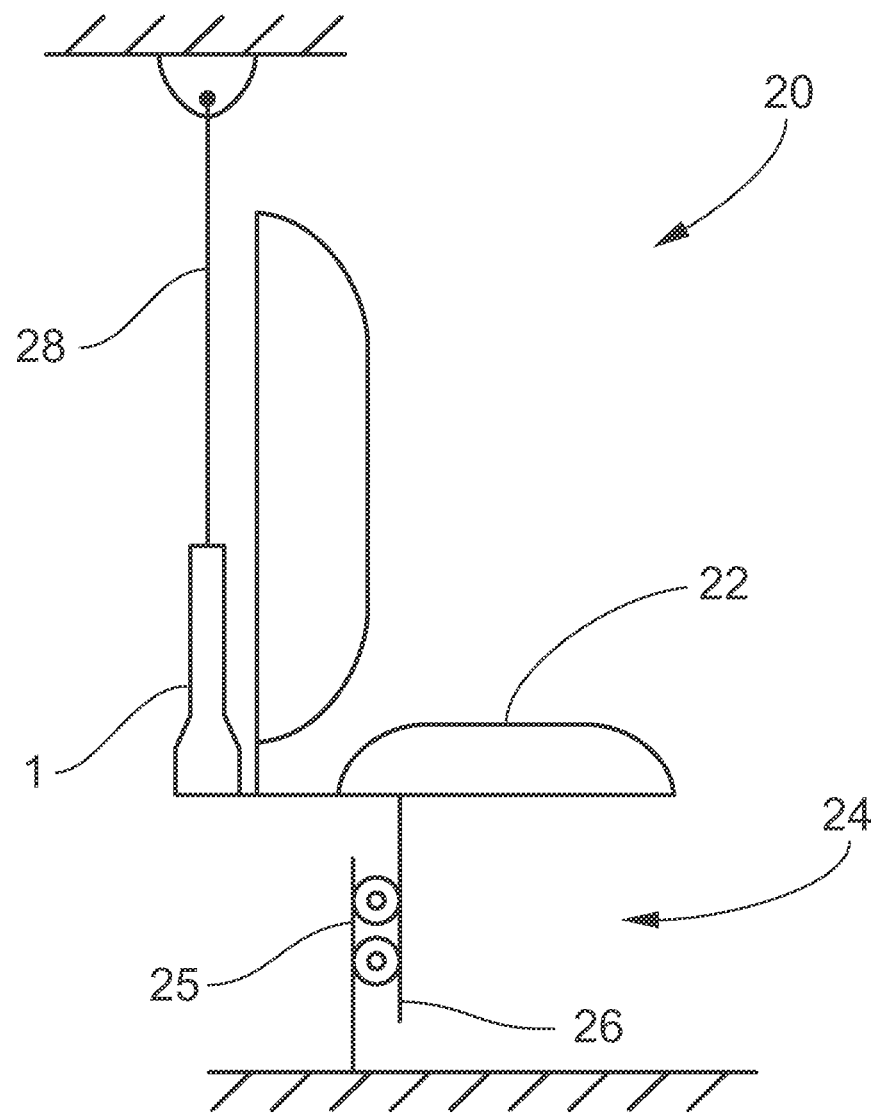
FIG. 4 is a schematic side view of an exemplary EA seating system incorporating the EA device of FIG. 1.

FIG. 4 depicts an exemplary energy attenuating seating system 20 in accordance with the present disclosure that incorporates the EA device 1 of FIGS. 1 through 3. Seating system 20 comprises a seat 22 supported in a substantially vertical direction by a seat guide 24 adapted to allow for guided vertical movement of seat 22 The seat guide 24 comprises a fixed portion 25 connected directly or indirectly to a fixed surface, and moving portion 26 connected directly or indirectly to the seat 22. A tube expansion EA device 1 is attached to the back of the seat 22 with the flared end down, and the cable 28 extending upward to a fixed structure or surface. Alternatively the EA device and cable could be inverted, with the cable attached to the seat, and the EA device suspended from the structure. Thus seat 22 is fully supported by cable 28 of EA device 1, and prevented from moving downward under non-catastrophic loading conditions.

However, if the downward load applied by the seat 22 to EA device 1 exceeds a certain threshold value, such as may occur for example during an under vehicle mine blast, the seat and the tube portion of EA device 1 will begin to move downward relative to cable 28 and the mandrel portion of the device. As the seat moves downward, the mandrel spreads the tube portion of EA device 1, absorbing energy. The seat will continue moving downward until the EA device 1 absorbs all of the energy of the event, or until the seat mechanically bottoms out against some other structure, whichever occurs first.

Figure 5:
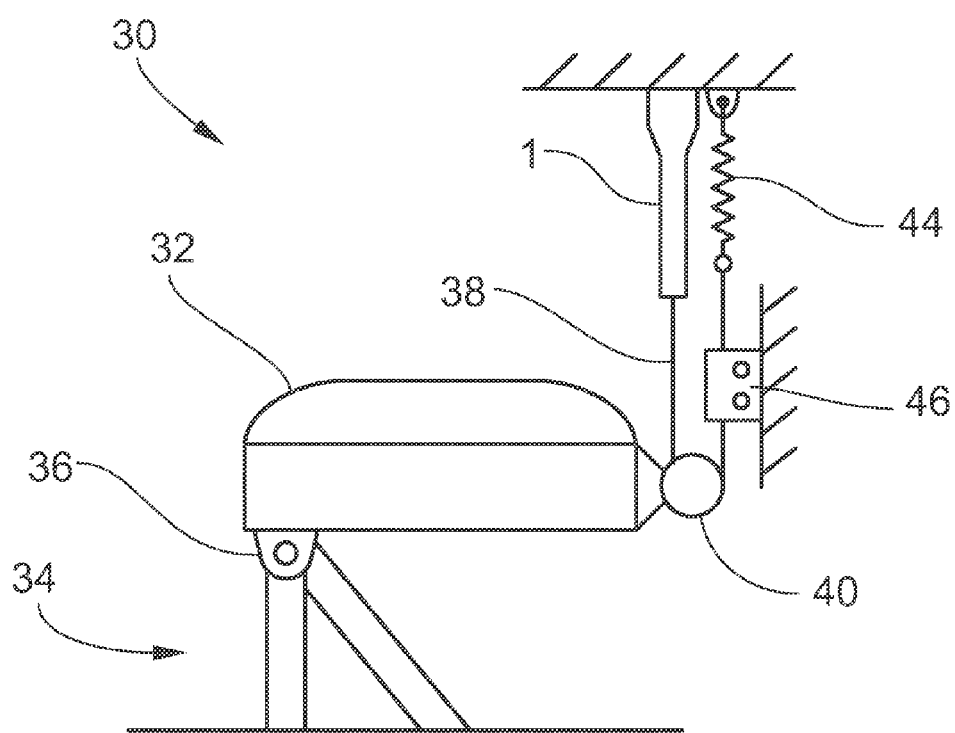
FIG. 5 is a schematic side view of an exemplary resettable EA seating system incorporating the EA device of FIG. 1.

FIG. 5 depicts a resettable energy attenuating seating system 30 in accordance with the present disclosure that again incorporates the EA device 1 of FIGS. 1 through 3. EA seating system 30 comprises a seat 32 that is also adapted for guided vertical motion, although in the form of a pivoting mounting system. In particular, seat 32 is attached to a fixed frame 34 near the front of the seat at a pivot joint 36. The back of seat 32 is supported by a cable 38 that passes around a pulley 40 attached to the back of the seat. A first side of cable 38 extends up from the front side of pulley 40 and into a tube-expansion EA device 1 suspended from a fixed structure or surface. That end of the cable is attached to the mandrel portion (not visible) of the EA device 1. A second side of cable 38 extends up from the back side of pulley 40 through a one way clutch device 46 to a tension spring 44.

Clutch device 46 operates like a cable ascender, allowing the cable to be pulled through in one direction but not the other direction. In particular, the device is configured to unlock and allow cable 38 to be pulled through it in an upward direction, but locks and prevents the cable from moving when the cable is pulled in a downward direction. Thus clutch device 46 prevents the second side of cable 38 from being pulled downward; and under normal, non-EA event conditions, the EA device 1 prevents the first side of cable 38 from being pulled downward. Accordingly the back of seat 32 is fully supported by cable 38 via pulley 40, and unable to move downward under non-EA event conditions.

However, during an EA type of event, if the downward load applied by the seat 32 and pulley 40 to the cable 38 exceeds a certain threshold value, the mandrel portion of EA device 1 will begin to move downward in the tube portion of the device. The downward motion of one side of the cable 38 consequently allows the back of the seat to move downward as the front of the seat pivots about joint 36. The seat will continue pivoting downward with the EA device absorbing energy until the load on the seat drops below the threshold value, or the seat mechanically bottoms out, whichever occurs first. The seat will then automatically reset when the load on the seat is reduced further to a reset load value. The seat reset value may be any load between zero, and the threshold value, including a load value on the order of the static weight of a seated occupant.

More specifically, when the seat load goes below the reset load value, tension spring 44 will pull the second side of the cable 38 upward through clutch device 46, taking up the slack and pulling the seat back up to the starting position of FIG. 5. The seat 32 may be further equipped with an adjustable stop mechanism (not shown) to prevent the back of the seat from being pulled upward beyond a comfortable level by spring 44. The EA seat system is then ready for another EA event, to the extent that there is sufficient stroke remaining in the EA device tube. Accordingly the EA seat system may be configured to safely attenuate multiple high energy shock load events without replacing the EA mechanism between events.

Figure 6:
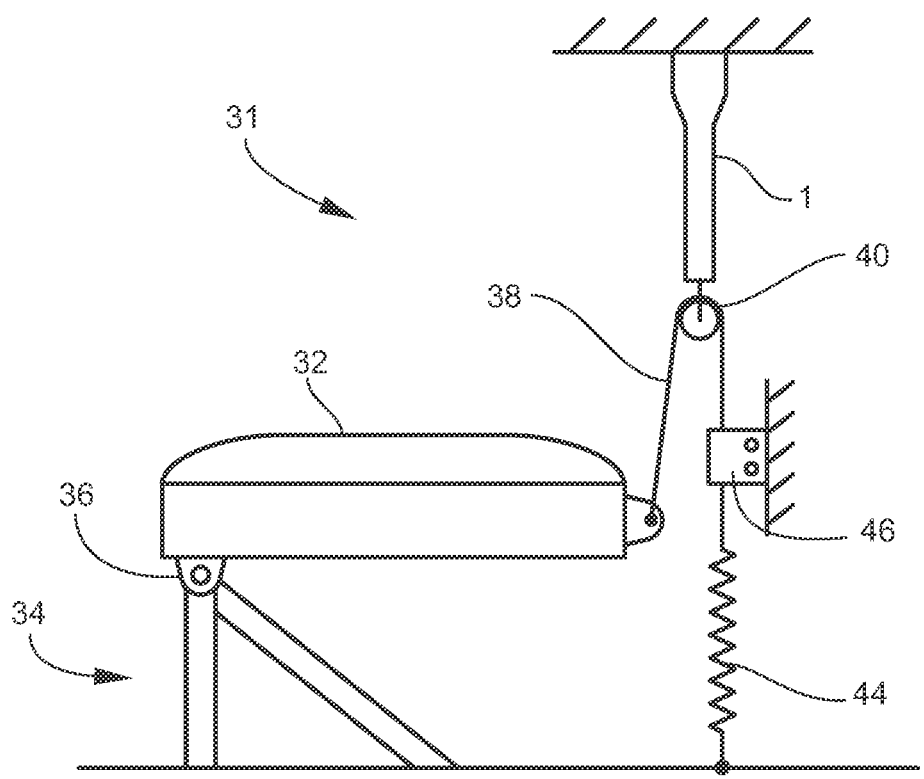
FIG. 6 is a schematic side view of another exemplary resettable EA seating system incorporating the EA device of FIG. 1.
Figure 7:
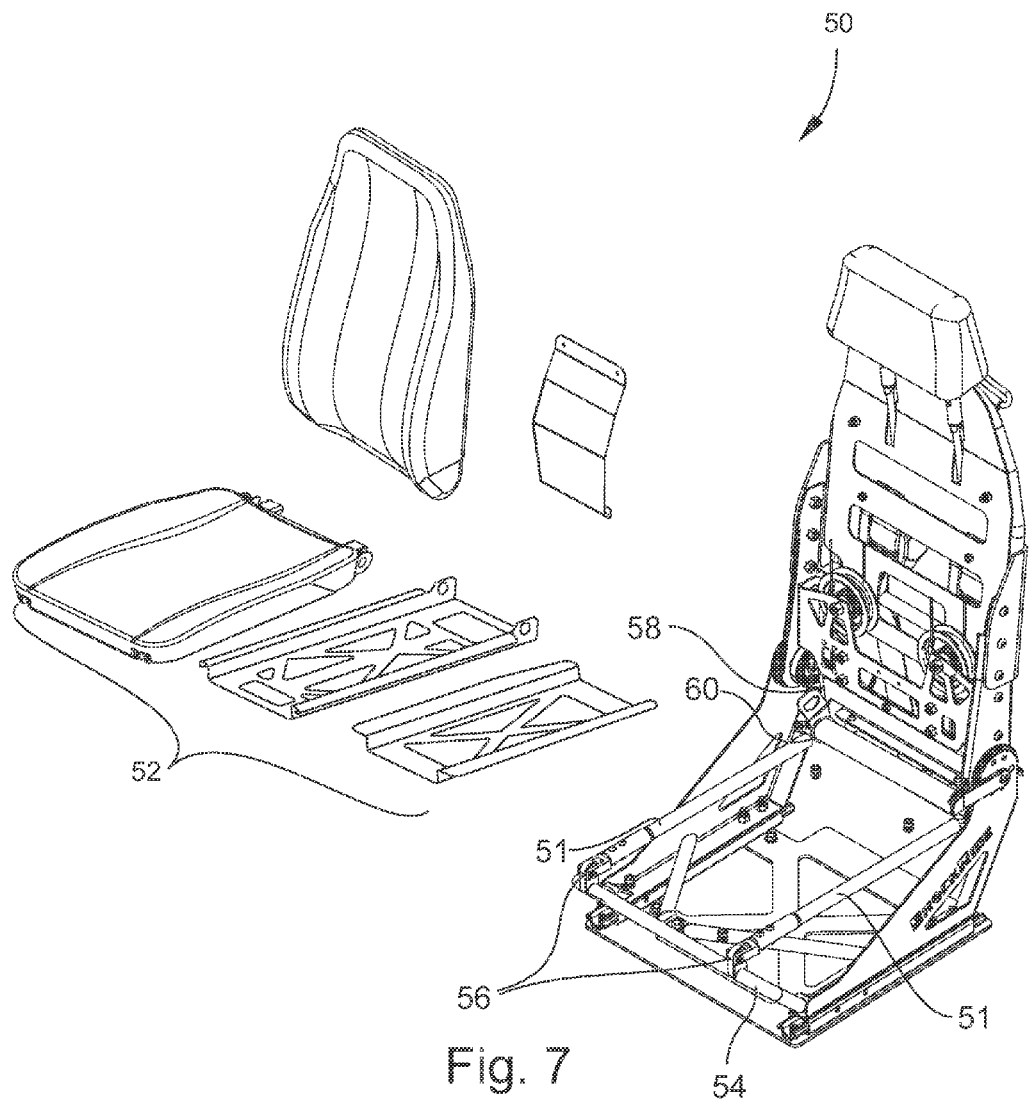
FIG. 7 is a partially exploded perspective view of another exemplary resettable EA seating system in accordance with the present disclosure.

FIG. 6 depicts another embodiment of a resettable energy attenuating seating system indicated generally at reference numeral 31. The embodiment of FIG. 6 contains much of the same elements as the embodiment of FIG. 5, however in a slightly different arrangement. Similar to the embodiment of FIG. 5, EA seating system 31 comprises a seat 32 attached to a fixed frame 34 near the front of the seat at a pivot joint 36. The back of seat 32 is supported by a cable 38 that in the present embodiment is attached directly to the seat, and from there extends up to and over pulley 40, then back down through the one way clutch device 46 to tension spring 44. The clutch device 46 is reversed in this embodiment, allowing the cable to slide through when pulled downward, but locking against the cable when pulled upward.

When cable 38 is placed in tension from a seat load, clutch device 46 prevents the cable from moving, and the back of the seat is thus supported by the cable and pulley 40. If the seat load reaches a point at which the downward load on pulley 40 exceeds the threshold value for the EA device, the mandrel portion of EA device will begin to displace downward along with pulley 40. The downward motion of pulley 40 consequently allows the back of the seat to move downward as the front of the seat pivots about joint 36. In this embodiment the downward motion of the seat is at exactly twice the rate of the downward motion of pulley 40. After the EA event, the seat resets itself by spring 44 pulling the cable 48 downward through clutch device 46, and the seat back up to the starting position of FIG. 6. Again, as long as there is sufficient stroke remaining in the EA device 1, the seat may be immediately used for another EA event.

Another embodiment of an exemplary, resettable, tube-expansion EA seating system is illustrated in FIGS. 7 through 10, and indicated generally at reference numeral 50. Seating system 50 is conceptually most similar to the previously described embodiment 30 of FIG. 5. In particular EA seating system 50 comprises a seat (bottom) 52 attached to a fixed frame 54 near the front of the seat at pivot joints 56. The back of seat 52 is supported by cables 58 that pass around pulleys 60 attached to the back of the seat 52. One end of cables 58 extends forward off the bottom of pulleys 60 into tube-expansion EA devices 51, where they connect to the mandrel portions 61 (see FIG. 10) of the devices. The forward ends of EA devices 51 are attached at pivot joints 56, thereby enabling devices 51 to pivot downward with seat 52. The other ends of cables 58 extend up from the back of pulleys 60 through one-way clutch devices 46 to spring loaded take-up reels 64. The take-up reels 64 serve the same function as spring 44 of embodiment 30, i.e. that of applying a continuous tension to cable 58 sufficient to reset the seat after an EA event, as will be described in greater detail below.

Figure 8:
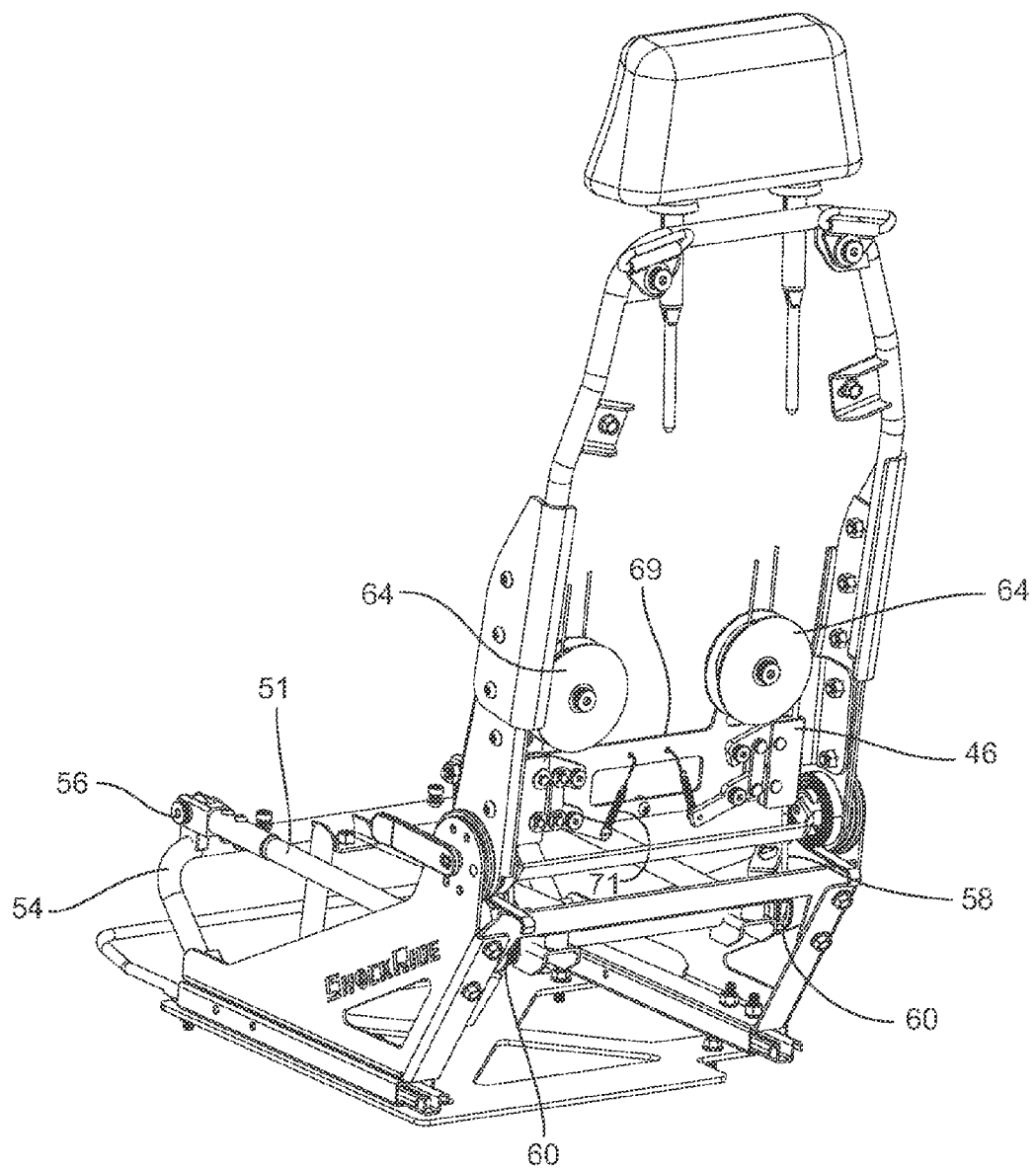
FIG. 8 is a rear perspective view of the seating system of FIG. 7.
Figure 9:
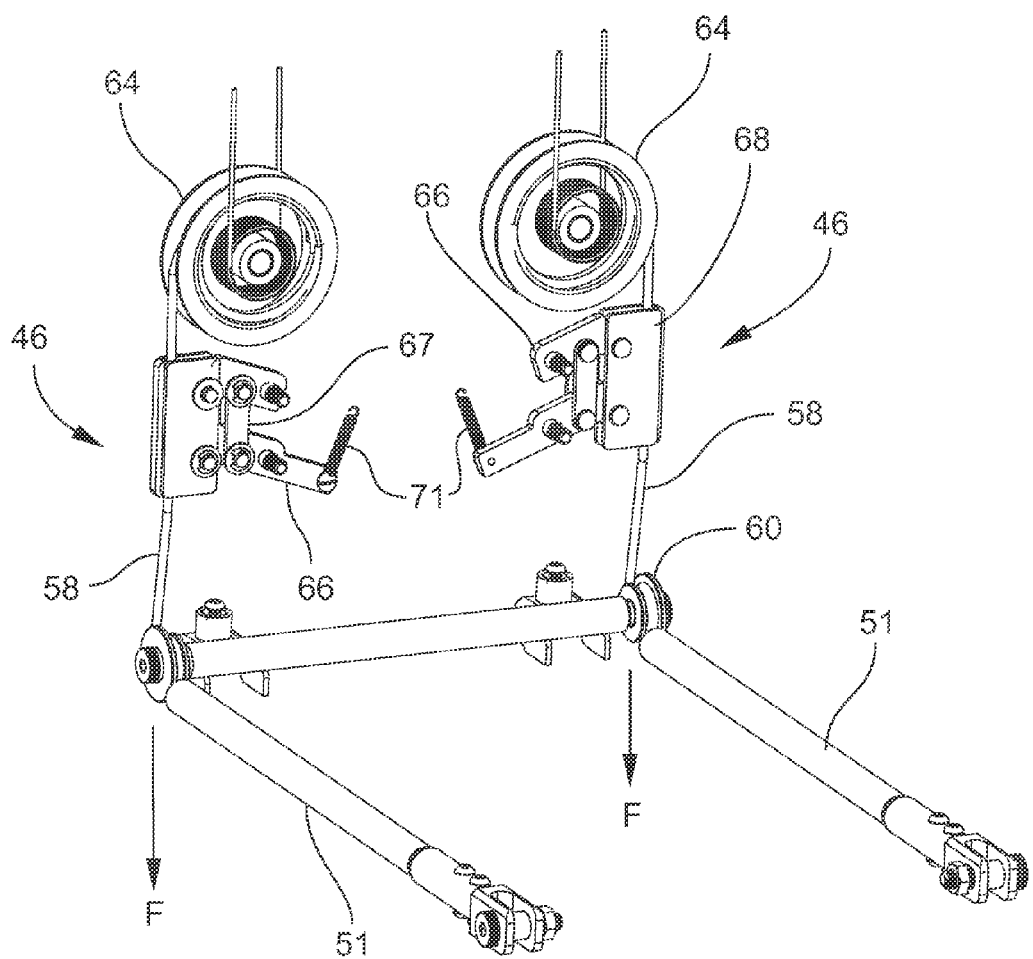
FIG. 9 is a perspective view of the EA devices and cable system incorporated in the EA seating system of FIG. 7.
Figure 10:
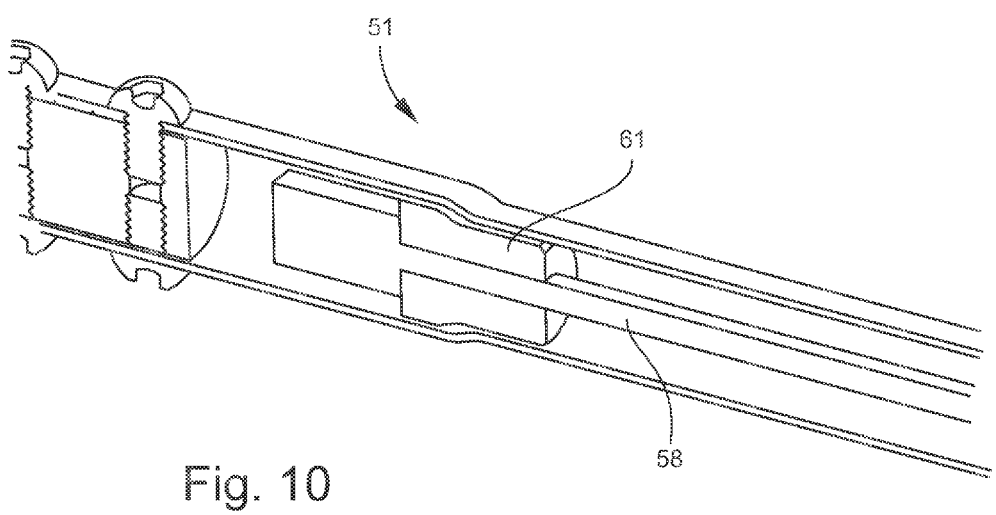
FIG. 10 is a cross section of the EA device of FIG. 7 showing the mandrel portion relative to the expanded portion of the tube.

Referring particularly to FIGS. 8 and 9, the one-way clutch 46 of the present embodiment comprises a pair of paws 66 connected by a link 67 that are pivotally mounted in a cable housing 68. The cable housing 68 is mounted to a seat back frame member 69 below take-up reels 64, which are also mounted to frame member 69. A spring 71 attached to the lower paw 66 applies an upward bias, tending to pivot both paws 66 via link 67 until the ends of the paws inside housing 68 bear against cable 58. The spring force is light enough to allow take-up reels 64 to pull cable 58 upward through clutch 46 without significant resistance from the paws 66, but heavy enough to cause paws 66 to initially grab and then pinch cable 58 when the cable is pulled downward by seat 52.

As best seen in FIGS. 8 and 9, a downward load applied to the seat is reacted at the front of the seat by pivot joints 56, and at the back of the seat by cables 58. Cables 58 are able to react the seat load because, as in the embodiment of FIG. 5, both ends of the cable are effectively fixed. More specifically, one-way clutch device 46 prevents one end of cable 58 from being pulled downward, while the mandrel 61 of EA device 51 prevents the other side of cable 58 from being pulled rearward. Thus under non-EA event conditions, a downward seat load produces tension in the cable but no movement, and the back of seat 52 is prevented from moving downward.

However, when the tension in cable 58 exceeds the threshold value, such as during a high energy vertical impact event, mandrel 61 will displace, expanding the tube portion of the EA devices, and allowing the back of the seat to move downward. As in the previous embodiments the seat will continue moving until the seat load being transmitted to cables 58 drops below the threshold value, or until the seat mechanically bottoms out, whichever occurs first. After the EA event, the spring loaded take-up reels 64 pull the cables 58 upward through clutch devices 46, bringing the seat up with it. The EA seat system is then reset and ready for another EA event, again as long as there is sufficient stroke remaining in the EA device.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating seating system for use in a vehicle compartment, comprising:
    a generally horizontal seat platform adapted for vertical motion relative to the vehicle compartment;
    an energy attenuating device comprising a metal tube held fixed at one end, and an oversized mandrel disposed in the tube;
    a cable attached to the mandrel and extending out the other end of the metal tube, the cable supporting the seat platform in a vertical direction, wherein the front end of the seat platform is pivotally mounted to a rigid seat frame, and the cable extends from the energy attenuating device, around a pulley attached to a back end of the seat platform, and through a one-way clutch device.

2. The energy attenuating seating system of claim 1, wherein the cable extends from the one-way clutch device to a spring-loaded retraction mechanism.

3. The energy attenuating seating system of claim 2, wherein the energy attenuating device is part of the seat bottom, and wherein the one-way clutch and retraction mechanism are both mounted to the rigid seat frame.

4. The energy attenuating seating system of claim 3, wherein the metal tube of the energy attenuating device comprises an expanded portion at the fixed end, and an unexpanded portion; and wherein the mandrel comprises a back end with a first diameter disposed in the expanded portion of the tube, and a front end with a second diameter smaller than the first diameter disposed in the unexpanded portion of the tube.

5. The energy attenuating seating system of claim 4, wherein the mandrel further comprises a tapered section between the front and back ends.

6. The energy attenuating seating system of claim 5, wherein the spring-loaded retraction mechanism applies a continuous tension to the cable with enough force to pull the cable through the one way clutch when the cable is sufficiently unloaded.

7. The energy attenuating seating system of claim 6, wherein the spring-loaded retraction device is a take-up reel with a coil torsion spring disposed about a hub.

8. A method of attenuating the force imparted to a seated passenger in a vehicle when the vehicle is exposed to an explosive energy pulse, comprising:
    providing a metal tube with an expanded portion at one end, and an unexpanded portion extending from the expanded portion to the other end;
    attaching the expanded portion end of the metal tube to a rigid seat frame;
    attaching a first end of a cable to an oversized mandrel disposed in the expanded portion of the tube;
    extending the cable out through the other end of the metal tube;
    fixing a distal portion of the cable substantially beyond the other end of the metal tube to the rigid seat frame;
    supporting a moveable bottom part of the seat with a portion of the cable between the first end and the fixed distal portion;
    pivotally attaching a front of the seat bottom to the rigid seat frame;
    mounting the metal tube under the seat bottom with the expanded end thereof also pivotally attached to the rigid seat frame; and
    extending the portion of the cable between the first end and the fixed distal portion around a pulley attached to the back end of the seat bottom, wherein the distal portion of the cable is fixed to a seat back portion of the rigid seat frame substantially above the pulley.

9. The method of claim 8, wherein fixing the cable to the seat back portion of the rigid seat frame comprises passing the cable through a one-way clutch device attached to the seat back seat back portion of the frame.

10. The method of claim 9, further comprising wrapping a second end of the cable around a spring loaded take-up reel.

11. The method of claim 8, wherein the metal tube is an integral part of the seat bottom.

* * * * *